(12) United States Patent
Moon

(10) Patent No.: US 9,773,354 B2
(45) Date of Patent: Sep. 26, 2017

(54) TERMINAL MOUNTED IN VEHICLE, CONTROL METHOD THEREOF, DATA CENTER AND CONTROL METHOD THEREOF

(71) Applicant: Hyundai Motor Company, Seoul (KR)

(72) Inventor: Sung Hwan Moon, Seoul (KR)

(73) Assignee: Hyundai Motor Company, Seoul (KR)

( * ) Notice: Subject to any disclaimer, the term of this patent is extended or adjusted under 35 U.S.C. 154(b) by 240 days.

(21) Appl. No.: 14/704,029

(22) Filed: May 5, 2015

(65) Prior Publication Data

US 2016/0171789 A1 Jun. 16, 2016

(30) Foreign Application Priority Data

Dec. 11, 2014 (KR) .................. 10-2014-0178324

(51) Int. Cl.
| | | |
|---|---|---|
| G07C 5/00 | (2006.01) |
| H04L 12/26 | (2006.01) |
| G08G 1/16 | (2006.01) |
| H04W 24/10 | (2009.01) |

(52) U.S. Cl.
CPC ............. *G07C 5/008* (2013.01); *G08G 1/161* (2013.01); *G08G 1/163* (2013.01); *G08G 1/164* (2013.01); *H04L 43/04* (2013.01); *H04W 24/10* (2013.01)

(58) Field of Classification Search
CPC ...... H04W 4/046; H04W 24/10; H04L 67/40; H04L 43/04; H04B 7/18591; G08G 1/205; G08G 1/161; G08G 1/163; G08G 1/164; G07C 5/008; G06F 9/30101; B60Q 1/2611
See application file for complete search history.

(56) References Cited

U.S. PATENT DOCUMENTS

| | | | | |
|---|---|---|---|---|
| 2007/0195939 A1* | 8/2007 | Sink | ..................... | B60Q 1/2611 379/37 |
| 2010/0269143 A1* | 10/2010 | Rabowsky | ......... | H04B 7/18591 725/63 |
| 2012/0041638 A1* | 2/2012 | Johnson | .................. | G07C 5/008 701/33.1 |
| 2012/0201041 A1* | 8/2012 | Gergets | ................ | B60Q 1/2611 362/493 |
| 2014/0130063 A1* | 5/2014 | Barrett | .................... | H04L 67/40 719/313 |
| 2014/0215491 A1* | 7/2014 | Addepalli | ............. | H04W 4/046 719/313 |
| 2014/0294180 A1* | 10/2014 | Link, II | ................. | G08G 1/205 380/270 |

(Continued)

FOREIGN PATENT DOCUMENTS

| | | |
|---|---|---|
| JP | 2004-185428 A | 7/2004 |
| JP | 2006-005878 A | 1/2006 |

(Continued)

*Primary Examiner* — Le H Luu
(74) *Attorney, Agent, or Firm* — Mintz Levin Cohn Ferris Glovsky and Popeo, P.C.; Peter F. Corless

(57) ABSTRACT

A control method for a terminal mounted in a vehicle includes: receiving at least one vehicle information message; extracting at least one piece of vehicle data from the at least one vehicle information message; generating a data package to be transmitted to a data center by grouping the at least one extracted piece of vehicle data into a designated unit; and transmitting the generated data package to the data center.

23 Claims, 4 Drawing Sheets

(56) References Cited

U.S. PATENT DOCUMENTS

2015/0296399 A1\* 10/2015 Huang ................. H04W 24/10
370/241
2015/0370563 A1\* 12/2015 Stark ................... G06F 9/30101
712/208

FOREIGN PATENT DOCUMENTS

| | | |
|---|---|---|
| JP | 2011-221813 A | 11/2011 |
| JP | 4880835 B2 | 2/2012 |
| JP | 2012-089992 A | 5/2012 |
| JP | 5006443 B2 | 8/2012 |
| JP | 5308536 B2 | 10/2013 |
| JP | 2014-138264 A | 7/2014 |
| KR | 10-1060681 B1 | 8/2011 |
| KR | 10-2014-0085133 A | 7/2014 |
| WO | 2010/140193 A1 | 12/2010 |

\* cited by examiner

TERMINAL MOUNTED IN VEHICLE, CONTROL METHOD THEREOF, DATA CENTER AND CONTROL METHOD THEREOF

CROSS-REFERENCE TO RELATED APPLICATION

This application claims priority to and the benefit of Korean Patent Application No. 10-2014-0178324, filed on Dec. 11, 2014, which is hereby incorporated by reference as if fully set forth herein.

BACKGROUND

Technical Field

The present disclosure relates to a terminal mounted in a vehicle, a control method thereof, a data center and a control method thereof, and more particularly, to a terminal mounted in a vehicle, a control method thereof, a data center and a control method thereof in which a vehicle data transmission load is effectively reduced.

Discussion of the Related Art

Due to recent advances in electronic control technology, various vehicles devices which were conventionally operated through mechanical methods are now operated by electrical methods, thereby increasing driver convenience and safety. Also, vehicle systems are gradually becoming more sophisticated and advanced.

As an example, recent research and development has been directed toward big data services in which data of a vehicle is collected in connection with technology mounted in the vehicle. Conventionally, when a data center collects many pieces of vehicle data from a vehicle-mounted terminal, the data transmission load may increase, and the data center may have difficulty managing the collected vehicle data. Further, in CAN communication, in order to prevent collision with a transmission message, conventional techniques include adjusting and managing a transmission timing to facilitate equalization of a communication load.

SUMMARY

Accordingly, the present disclosure is directed to a terminal mounted in a vehicle, a control method thereof, a data center and a control method thereof that substantially obviate one or more problems due to limitations and disadvantages of the related art.

An object of the present disclosure is to provide a terminal mounted in a vehicle, a control method thereof, a data center and a control method thereof in which a vehicle data transmission load is effectively reduced. Another object of the present disclosure is to provide a data center which adjusts the cycle and amount of vehicle data necessary for a terminal mounted in a vehicle and thus effectively collects data.

Additional advantages, objects, and features of the disclosure will be set forth in part in the description which follows and in part will become apparent to those having ordinary skill in the art upon examination of the following or may be learned from practice of the disclosed embodiments. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a control method for a terminal mounted in a vehicle includes: receiving at least one vehicle information message; extracting at least one piece of vehicle data from the at least one vehicle information message; generating a data package to be transmitted to a data center by grouping the at least one extracted piece of vehicle data into a designated unit; and transmitting the generated data package to the data center.

The at least one vehicle information message may be received from at least one electronic control unit (ECU) of the vehicle through in-vehicle communication.

The at least one piece of vehicle data may be extracted from at least some of the at least one vehicle information message, when the at least some of the at least one vehicle information message includes vehicle data.

The data package may be generated based on a cycle of transmission of each of the at least one piece of vehicle data received from the data center.

The data package may be generated based on a frequency of transmission of each of the at least one piece of vehicle data received from the data center.

The generated data package may be transmitted to the data center, when an event message indicating immediate transmission of the data package is received from the data center.

The generated data package may include the event message.

The control method may further include receiving a user agreement prior to the transmission of the generated data package to the data center.

Furthermore, according to embodiments of the present disclosure, a terminal mounted in a vehicle includes: a modem unit configured to receive at least one vehicle information message; and a controller configured to extract at least one piece of vehicle data from the at least one vehicle information message, to generate a data package to be transmitted to a data center by grouping the at least one extracted piece of vehicle data into a designated unit, and to transmit, through the modem unit, the generated data package to the data center.

The controller may be further configured to receive the at least one vehicle information message from at least one ECU of the vehicle through in-vehicle communication.

The controller may be further configured to extract the at least one piece of vehicle data from at least some of the at least one vehicle information message, when the at least some of the at least one vehicle information message includes vehicle data.

The controller may be further configured to generate the data package based on a cycle of transmission of each of the at least one piece of vehicle data received from the data center.

The controller may be further configured to generate the data package based on a frequency of transmission of each of the at least one piece of vehicle data received from the data center.

The controller may be further configured to transmit the generated data package to the data center, when an event message indicating immediate transmission of the data package is received from the data center.

The controller may be further configured to include the event message in the generated data package.

The controller may be further configured to receive a user agreement prior to the transmission of the generated data package to the data center.

Furthermore, according to embodiments of the present disclosure, a control method for a data center includes:

transmitting transmission frequencies of pieces of vehicle data collected from a vehicle to a terminal mounted in the vehicle; and receiving a data package acquired by grouping at least some of the pieces of vehicle data.

The control method may further include collecting the pieces of vehicle data from the received data package based on kinds of the vehicle data.

Furthermore, according to embodiments of the present disclosure, a data center includes: a modem unit configured to communicate with a telematics terminal of a vehicle; and a controller configured to transmit transmission frequencies of pieces of vehicle data collected from the vehicle to a terminal mounted in the vehicle and to receive, through the modem unit, a data package acquired by grouping at least some of the pieces of vehicle data.

The controller may be further configured to collect the pieces of vehicle data from the data package based on kinds of the vehicle data.

The controller may be further configured to analyze the collected pieces of vehicle data.

The controller may be further configured to additionally transmit an event message indicating immediate transmission of the data package.

Furthermore, according to embodiments of the present disclosure, a non-transitory computer readable recording medium having a program to execute a control method for a terminal mounted in a vehicle includes: receiving at least one vehicle information message; extracting at least one piece of vehicle data from the at least one vehicle information message; generating a data package to be transmitted to a data center by grouping the at least one extracted piece of vehicle data into a designated unit; and transmitting the generated data package to the data center.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the present disclosure and are incorporated in and constitute a part of this application, illustrate embodiments of the disclosure and together with the description serve to explain the principle of the disclosure. The same or similar elements are denoted by the same reference numerals even though they are depicted in different drawings, and a detailed description thereof will be omitted. In the drawings.

DETAILED DESCRIPTION OF THE EMBODIMENTS

Figure 1:
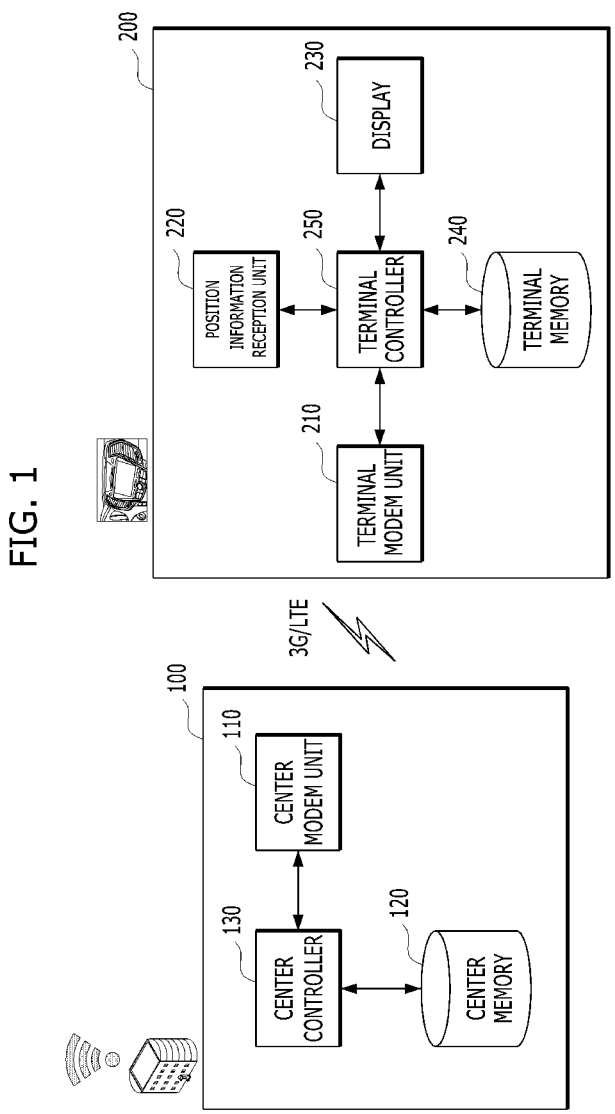
FIG. 1 is a block diagram illustrating a terminal mounted in a vehicle and a data center in accordance with embodiments of the present disclosure.

Reference will now be made in detail to the embodiments of the present disclosure, examples of which are illustrated in the accompanying drawings. The suffixes "module" and "unit" in elements used in the description below are given or used together only in consideration of ease in preparation of the specification and do not have distinctive meanings or functions. In the following description of embodiments of the present disclosure, a detailed description of known functions and configurations incorporated herein will be omitted when it may make the subject matter of the present disclosure rather unclear.

Further, in description of elements of the present invention, the terms "first", "second", etc. may be used. These terms are used only to discriminate one element from other elements, and the nature, order, or sequence of the corresponding element is not limited by these terms.

If it is stated that an element is "connected to", "combined with", or "coupled with" another element, it will be understood that the former may be directly connected to or combined with the latter or other elements may be interposed between the two elements. On the other hand, if it is stated that an element is "connected directly to", "combined directly with", or "coupled directly with" another element, it will be understood that other elements are not interposed between the two elements. A singular expression may include a plural expression unless they have different meanings in the context.

It will further be understood that the terms "including" and "having" mean presence of features, numbers, stages, operations, elements, parts, or combinations thereof stated in the specification or combinations thereof and does not exclude presence of one or more other features, numbers, stages, operations, elements, parts, or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a block diagram illustrating a terminal mounted in a vehicle and a data center in accordance with embodiments of the present disclosure.

A data center 100 may collect vehicle information and construct "big data." Big data, in exact terms, means bulky data, the amount, cycle, and format of which are massive. The data center 100 may collect vehicle data from many vehicles, and analyze and use the collected vehicle data. For example, the data center 100 may collect vehicle failure information, driving information, modem information, signal information of electronic control units (ECUs) mounted in vehicles and the like. The vehicle failure information may include failure histories and periodic inspection dates of vehicles. The driving information may include information, such as the velocities and temperatures of vehicles during driving. The modem information may include information, such as powers and signal intensities of modems of vehicles. Further, the signal information of ECUs mounted in vehicles may include information, such as powers and signal intensities of the respective ECUs.

In implementation, the data center 100 which is a center provided separately from a telematics center (not shown) may communicate with the telematics center. However, in the present disclosure, it is assumed that the data center 100 may include a telematics center. Therefore, the data center 100 serving as a telematics center may provide various services to a terminal 200 mounted in a vehicle. For example, the data center 100 may provide information regarding vehicle accidents, theft sensing and driving path guidance, traffic and living information, games and the like to the terminal 200.

Hereinafter, elements of the data center 100 and the terminal 200 mounted in the vehicle will be described in detail.

The data center 100 may include a center modem unit 110, a center memory 120, and a center controller 130. The data center 100 may include elements provided in number greater than these elements, but only the elements necessary for description of the present invention are displayed.

The center modem unit 110 may communicate with a terminal modem unit 210 of the terminal 200 mounted in a vehicle. The center modem unit 110 may communicate with other mobile terminals.

The center memory 120 may serve as a unit to store big data under control of the center controller 130. The center memory 120 may store information necessary in relation with an apparatus communicating with the data center 100. The center memory 120 may include at least one storage medium of a flash memory type storage unit, a hard disk type storage unit, a solid state disk (SSD) type storage unit, a silicon disk drive (SDD) type storage unit, a multimedia card micro type storage unit, a card type storage unit (for example, an SD or XD storage unit), a random access memory (RAM), a static random access memory (SRAM), a read-only memory (ROM), an electrically erasable programmable read-only memory (EEPROM), a programmable read-only memory (PROM), a magnetic storage unit, and the like. Although the center memory 120 may be described as one element of the data center 100, the center memory 120 may be implemented as a separate server storing big data.

The center controller 130 may control the overall operation of the data center 100.

On the other hand, the terminal 200 mounted in the vehicle may include a terminal modem unit 210, a terminal position information reception unit 220, a display 230, a terminal memory 240, and a terminal controller 250. In this case, the terminal 200 in the terminal may include an AVN terminal, a telematics terminal, or a gateway for in-vehicle communication (e.g., CAN communication).

Although the disclosure describes the terminal 200 mounted in the vehicle as including the terminal modem unit 210 and the terminal position information reception unit 220, the terminal 200 may be implemented as including a terminal position information reception unit 220 provided separately from a unit (not shown) including a modem mounted in the vehicle. Here, the unit mounted in the vehicle may communicate with the terminal position information reception unit 220 through in-vehicle communication, such as a Controller Area Network (CAN).

The terminal 200 mounted in the vehicle generally includes the display 230 disposed on the front portion of the inside of the vehicle. Further, the terminal 200 mounted in the vehicle provides audio, video, and navigation functions The terminal modem unit 210 may include one or more modules enabling wireless communication between the terminal 200 mounted in the vehicle and a wireless communication system, the terminal 200 mounted in the vehicle and a terminal 200 mounted in another vehicle, or the terminal 200 mounted in the vehicle and an external center. Further, the terminal modem unit 210 may include one or more modules connecting the terminal 200 mounted in the vehicle to one or more networks. The terminal modem unit 210 may communicate with the data center 100. In general, the terminal modem unit 210 may communicate with the data center 100 using wireless communication. The terminal modem unit 20 may transmit and receive a wireless signal to and from at least one of a base station, an external terminal, and a center on a mobile communication network constructed according to technical standards or communication schemes for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like). The wireless signal may include a voice call signal, a video call signal or various types of data according to text/multimedia message transmission and reception.

The position information reception unit 220 serves to acquire the position (i.e., the current position) of the terminal 200 mounted in the vehicle. For example, the position of the terminal 200 mounted in the vehicle may be acquired using a signal transmitted from a GPS satellite through the position information reception unit 220. Further, the terminal 200 mounted in the vehicle may support Wi-Fi, Bluetooth, Wi-Fi direct, and the like.

The display 230 may include at least one of a liquid crystal display (LCD), a thin film transistor-liquid crystal display (TFT LCD), an organic light emitting diode (OLED), a flexible display, a 3D display, an e-ink display, and the like. The display 230 may include a touch sensor to sense touch on the display 230 so as to receive a control command input through touch. Using such a method, when touch on the display 230 occurs, the touch sensor may sense the touch and the terminal controller 250 may generate a control command corresponding to the touch. Contents input through touch may include text, numbers, or menu items which may be indicated or designated in various modes.

The terminal memory 240 stores data to support various functions of the terminal 200 mounted in the vehicle. The terminal memory 240 may store a plurality of application programs or applications executed in the terminal 200 mounted in the vehicle and data and commands to operate the terminal 200 mounted in the vehicle. At least some of these application programs may be downloaded from an external center through wireless communication. Further, at least some of these application programs may be preinstalled in the terminal 200 mounted in the vehicle so as to execute basic functions of the terminal 200 mounted in the vehicle. The application programs may be stored in the terminal memory 240, installed in the terminal 200 mounted in the vehicle, and driven by the terminal controller 250 so as to perform the operation (i.e., function) of the terminal 200 mounted in the vehicle.

The terminal memory 240 may store programs to operate the terminal controller 250 and temporarily store pieces of input/output data (e.g., phonebooks, messages, still images, moving pictures, and the like). The terminal memory 240 may store data regarding various patterns of vibration and sound which are output when touch on a touchscreen is input. The terminal memory 240 may include at least one storage medium of a flash memory type storage unit, a hard disk type storage unit, a solid state disk (SSD) type storage unit, a silicon disk drive (SDD) type storage unit, a multimedia card micro type storage unit, a card type storage unit (for example, an SD or XD storage unit), a random access memory (RAM), a static random access memory (SRAM), a read-only memory (ROM), an electrically erasable programmable read-only memory (EEPROM), a programmable read-only memory (PROM), a magnetic storage unit, a magnetic disk, an optical disc, and the like. The terminal 200 mounted in the vehicle may be operated in relation with a web storage performing the storage function of the storage unit 170 over the Internet.

The terminal controller 250 controls the overall operation of the terminal 200 mounted in the vehicle in addition to operations regarding the application programs. The terminal controller 250 may process signals, data, or information, input or output through the above-described elements, or drive the application programs stored in the terminal memory 240, thus processing or providing proper information or functions to a user.

The terminal controller 240 may receive current position information of the terminal 200 mounted in the vehicle through the terminal position information reception unit 220. The current position information may be received through GPS reception.

Figure 2:
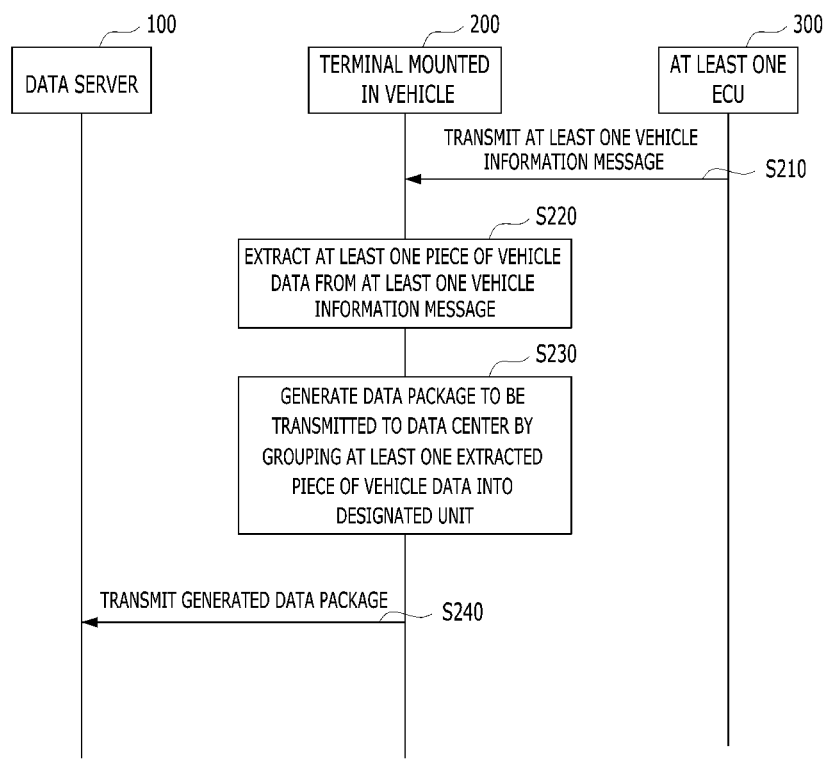
FIG. 2 is a sequence diagram illustrating a control method of a terminal mounted in a vehicle in accordance with embodiments of the present disclosure.

FIG. 2 is a sequence diagram illustrating a control method of a terminal mounted in a vehicle in accordance with embodiments of the present disclosure.

First, the terminal controller 250 receives at least one vehicle information message (Operation S210). The terminal controller 250 may receive the at least one vehicle information message through in-vehicle communication, such as a CAN.

In this case, the terminal controller 250 may receive vehicle information from ECUs included in a power train CAN, a chassis CAN, a multimedia CAN, and a body CAN. The terminal controller 250 may receive the above-described vehicle failure information, driving information, modem information, and signal information of electronic control units (ECUs) mounted in the vehicle and the like.

For example, the terminal controller 250 may receive velocity information, intake air temperature information, water temperature information and RPM information of the vehicle through in-vehicle communication. The terminal controller 250 receives the above-described vehicle information in a message type. If the in-vehicle communication is CAN communication, a message includes not only vehicle information but also data according to CAN communication protocols and other information.

Thereafter, the terminal controller 250 extracts vehicle data from the at least one vehicle information message (Operation S220). The terminal controller 250 may extract only vehicle information, i.e., vehicle data, from among numerous vehicle information messages. For example, the terminal controller 250 may extract only velocity information from a vehicle information message including the velocity information, extract only intake air temperature information from a vehicle information message including the intake air temperature information, extract only water temperature information from a vehicle information message including the water temperature information, and extract only RPM information from a vehicle information message including the RPM information. Further, if, among a plurality of vehicle information messages, at least some vehicle information messages include vehicle data, the terminal controller 250 may select the messages including the vehicle data and extract the vehicle data from the selected messages.

Thereafter, the terminal controller 250 generates a data package to be transmitted to the data center 100 by grouping at least one extracted piece of vehicle data into a designated unit (Operation S230). The terminal controller 250 generates a data package of a designated unit by extracting only vehicle data from a plurality of vehicle information messages. Here, the terminal controller 250 may generate the data package having a size which is receivable by the data center 100. Further, the terminal controller 250 may receive the time, cycle, and frequency of transmission of vehicle data from the data center 100 and generate a data package based on the received information. A detailed description thereof will be given later with reference to FIGS. 3 and 4.

Finally, the terminal controller 250 transmits the generated data package to the data center 100 (Operation S240). Further, the terminal controller 250 may receive a user agreement about provision of the above-described vehicle data to the data center 100. The terminal controller 250 may transmit the vehicle data to the data center 100 only if there is a user agreement.

Figure 3:
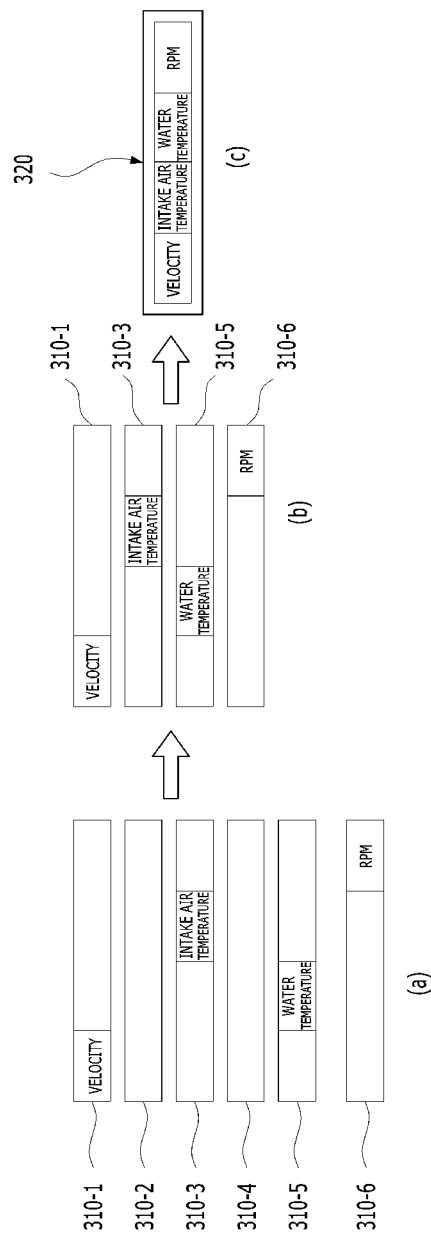
FIG. 3 contains views illustrating an operation of a terminal mounted in a vehicle, which receives vehicle data messages, extracts vehicle data, groups the vehicle data into a designated unit and generates a data package, in accordance with embodiments of the present disclosure.

FIG. 3 contains views illustrating an operation of a terminal mounted in a vehicle, which receives vehicle data messages, extracts vehicle data, groups the vehicle data into a designated unit and generates a data package, in accordance with embodiments of the present disclosure.

As exemplarily shown in section (a) of FIG. 3, the terminal controller 250 receives at least one vehicle information message, i.e., vehicle information messages 310-1 to 310-6, through CAN communication. Among the vehicle information messages 310-1 to 310-6, some vehicle information messages 310-1, 310-3, 310-5 and 310-6 include vehicle data (i.e., 'velocity', 'intake air temperature', 'water temperature', and 'RPM'). On the other hand, some vehicle information messages 310-2 and 310-4 include no vehicle data.

As exemplarily shown in section (b) of FIG. 3, the terminal controller 250 may exclude the vehicle information messages 310-2 and 310-4 including no vehicle data.

Thereafter, as exemplarily shown in section (c) of FIG. 3, the terminal controller 250 extracts vehicle data from the vehicle information messages 310-1, 310-3, 310-5 and 310-6 among the vehicle information messages 310-1 to 310-6. Then, the terminal controller 250 generates a data package using the extracted vehicle data. That is, the terminal controller 250 generates a data package using the vehicle data including 'velocity', 'intake air temperature', 'water temperature' and 'RPM'.

As described above, in the present disclosure, the terminal controller 250 transmits vehicle data in the data package form to the data center 100 and thus, a data transmission load may be effectively reduced. Thereby, cost reduction and apparatus efficiency may be improved.

Figure 4:
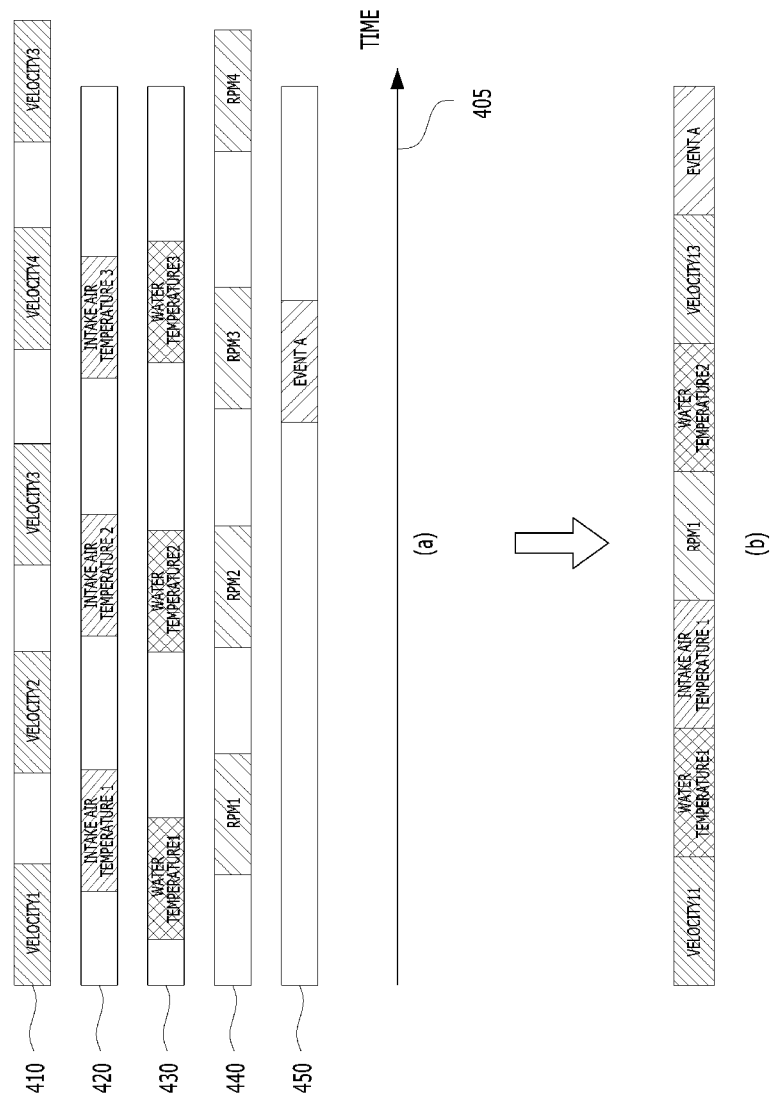
FIG. 4 contains views illustrating generation of a data package, in which requirements of a data center are reflected, by a terminal mounted in a vehicle in accordance with embodiments of the present disclosure.

FIG. 4 contains views illustrating generation of a data package, in which requirements of a data center are reflected, by a terminal mounted in a vehicle in accordance with embodiments of the present disclosure.

Section (a) of FIG. 4 illustrates vehicle data which the terminal controller 250 sequentially receives. The terminal controller 250 receives vehicle data in order of 'velocity 1', 'intake air temperature 1', 'water temperature 1', 'RPM 1', 'velocity 2', 'water temperature 2', 'RPM 2', 'intake air temperature 2', 'velocity 3', 'event A', 'RPM 3', 'intake air temperature 3', . . . . Here, the data center 100 may adjust the cycle and the frequency of vehicle data in a data package received by the data center 100 from the terminal controller 250. For example, if the data center 100 request to the terminal controller 220 to receive all water temperature information and to receive alternately velocity information, intake air temperature information and RPM information, the data center 100 may receive the vehicle data in order of 'velocity 1', 'water temperature 1', 'intake air temperature 1', 'RPM 1', 'water temperature 2', 'velocity 3', . . . .

The data center 100 may determine the size of the data package generated by the terminal controller 250. If the data center 100 transmits 'event A' to the terminal controller 250, the terminal controller 250 may generate a data package using vehicle data 'event A' as the last piece of vehicle data and transmit the data package to the data center 100 (e.g., see section (b) of FIG. 4). In such a manner, the data center 100 may determine the size of a received data package, adjust disposition of pieces of vehicle data in the data package, and adjust the number of pieces of vehicle data to be received. If a problem occurs during driving of the vehicle, the data center 100 may more frequently collect doubtful vehicle data and thus rapidly solve the problem of the vehicle. Further, the data center 100 may collect the most necessary vehicle data under various conditions and thus facilitate driver convenience.

As apparent from the above description, in a terminal mounted in a vehicle, a control method thereof, a data center and a control method thereof in accordance with embodiments, a vehicle data transmission load is effectively reduced and thus, apparatus efficiency may be improved. Further, the cycle and amount of vehicle data necessary for the terminal mounted in the vehicle are adjusted and thus, data may be effectively collected.

It will be apparent to those skilled in the art that various modifications and variations can be made in the disclosed embodiments without departing from the spirit or scope of the present disclosure. Thus, it is intended that the present disclosure covers the modifications and variations of the subject matter disclosed herein provided they come within the scope of the appended claims and their equivalents.

What is claimed is:

1. A control method for a terminal mounted in a vehicle comprising:
   receiving a plurality of vehicle information messages from a plurality of electronic control units (ECUs) mounted in the vehicle;
   receiving an indication of desired pieces of vehicle data and an ordering of the desired pieces of vehicle data from a data center;
   extracting a plurality of pieces of vehicle data from the plurality of vehicle information messages in accordance with the indicated desired pieces of vehicle data;
   generating a data package to be transmitted to the data center by grouping the extracted plurality of pieces of vehicle data into a designated unit in an order corresponding to the indicated ordering of the desired pieces of vehicle data; and
   transmitting the generated data package to the data center.

2. The method according to claim 1, wherein the at least one vehicle information message is received from the plurality of ECUs through in-vehicle communication.

3. The method according to claim 1, wherein the plurality of pieces of vehicle data is extracted from at least some of the plurality of vehicle information messages, when the at least some of the plurality of vehicle information messages includes vehicle data.

4. The method according to claim 1, wherein the data package is generated based on a cycle of transmission of each of the plurality of pieces of vehicle data received from the data center.

5. The method according to claim 1, wherein the data package is generated based on a frequency of transmission of each of the plurality of pieces of vehicle data received from the data center.

6. The method according to claim 1, wherein the generated data package is transmitted to the data center, when an event message indicating immediate transmission of the data package is received from the data center.

7. The method according to claim 6, wherein the generated data package includes the event message.

8. The method according to claim 1, further comprising receiving a user agreement prior to the transmission of the generated data package to the data center.

9. A terminal mounted in a vehicle comprising:
   a modem unit configured to receive a plurality of vehicle information messages from a plurality of electronic control units (ECUs) mounted in the vehicle and to receive an indication of desired pieces of vehicle data and an ordering of the desired pieces of vehicle data from a data center; and
   a controller configured to extract a plurality of pieces of vehicle data from the plurality of vehicle information messages in accordance with the indicated desired pieces of vehicle data, to generate a data package to be transmitted to the data center by grouping the extracted plurality of pieces of vehicle data into a designated unit in an order corresponding to the indicated ordering of the desired pieces of vehicle data, and to transmit, through the modem unit, the generated data package to the data center.

10. The terminal according to claim 9, wherein the controller is further configured to receive the plurality of vehicle information messages from the plurality of ECUs through in-vehicle communication.

11. The terminal according to claim 9, wherein the controller is further configured to extract the plurality of pieces of vehicle data from at least some of the plurality of vehicle information messages, when the at least some of the plurality of vehicle information messages includes vehicle data.

12. The terminal according to claim 9, wherein the controller is further configured to generate the data package based on a cycle of transmission of each of the plurality of pieces of vehicle data received from the data center.

13. The terminal according to claim 9, wherein the controller is further configured to generate the data package based on a frequency of transmission of each of the plurality of pieces vehicle data received from the data center.

14. The terminal according to claim 9, wherein the controller is further configured to transmit the generated data package to the data center, when an event message indicating immediate transmission of the data package is received from the data center.

15. The terminal according to claim 14, wherein the controller is further configured to include the event message in the generated data package.

16. The terminal according to claim 9, wherein the controller is further configured to receive a user agreement prior to the transmission of the generated data package to the data center.

17. A control method for a data center comprising:
transmitting an indication of desired pieces of vehicle data and an ordering of the desired pieces of vehicle data to a terminal mounted in a vehicle, wherein a plurality of pieces of vehicle data are extracted from a plurality of vehicle information messages by the terminal in accordance with the indicated desired pieces of vehicle data; and
receiving a data package generated by grouping the extracted plurality of pieces of vehicle data into a designated unit in an order corresponding to the indicated ordering of the desired pieces of vehicle data,
wherein the plurality of vehicle information messages are generated by a plurality of electronic control units (ECUs) in the vehicle.

18. The control method according to claim 17, further comprising collecting the plurality of pieces of vehicle data from the received data package based on kinds of the vehicle data.

19. A data center comprising:
a modem unit configured to communicate with a telematics terminal of a vehicle; and
a controller configured to transmit, through the modem unit, an indication of desired pieces of vehicle data and an ordering of the desired pieces of vehicle data to the telematics terminal, wherein a plurality of pieces of vehicle data are extracted from a plurality of vehicle information messages by the telematics terminal in accordance with the indicated desired pieces of vehicle data, and to receive, through the modem unit, a data package generated by grouping the extracted plurality of pieces of vehicle data into a designated unit in an order corresponding to the indicated ordering of the desired pieces of vehicle data,
wherein the plurality of vehicle information messages are generated by a plurality of electronic control units (ECUs) mounted in the vechicle.

20. The data center according to claim 19, wherein the controller is further configured to collect the plurality of pieces of vehicle data from the data package based on kinds of the vehicle data.

21. The data center according to claim 20, wherein the controller is further configured to analyze the collected pieces of vehicle data.

22. The data center according to claim 19, wherein the controller is further configured to additionally transmit an event message indicating immediate transmission of the data package.

23. A non-transitory computer readable recording medium having a program to execute a control method for a terminal mounted in a vehicle, wherein the control method includes:
receiving a plurality of vehicle information messages from a plurality of electronic control units (ECUs) mounted in the vehicle;
receiving an indication of desired pieces of vehicle data and an ordering of the desired pieces of vehicle data from a data center;
extracting a plurality of pieces of vehicle data from the plurality of vehicle information messages in accordance with the indicated desired pieces of vehicle data;
generating a data package to be transmitted to the data center by grouping the extracted plurality of pieces of vehicle data into a designated unit; and
transmitting the generated data package to the data center in an order corresponding to the indicated ordering of the desired pieces of vehicle data.

* * * * *